P. HUFFMAN.
HORSESHOEING RACK.
APPLICATION FILED FEB. 14, 1913.
1,077,475.
Patented Nov. 4, 1913.
2 SHEETS—SHEET 1.
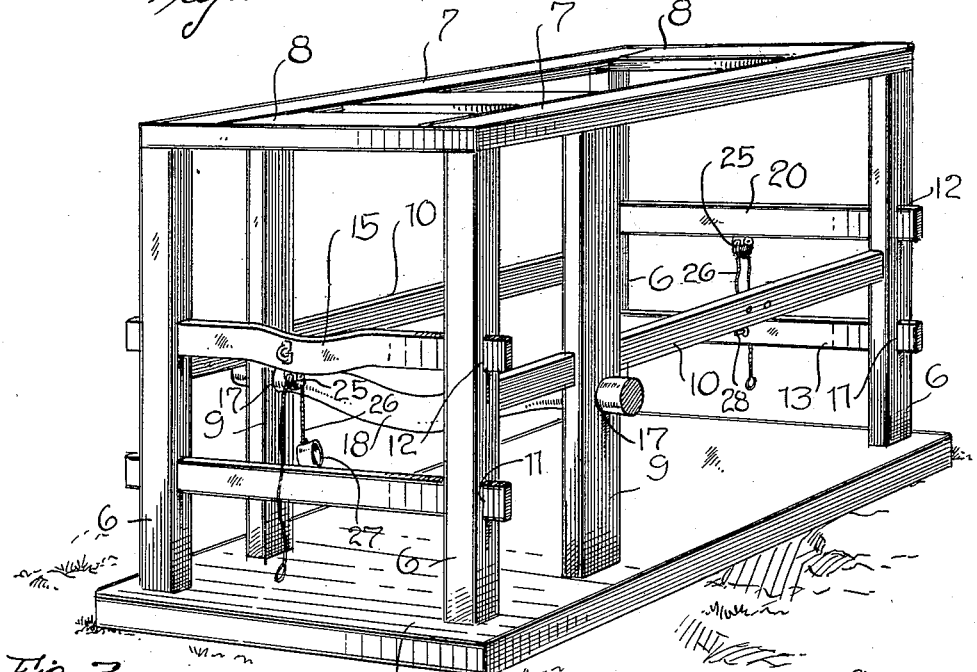
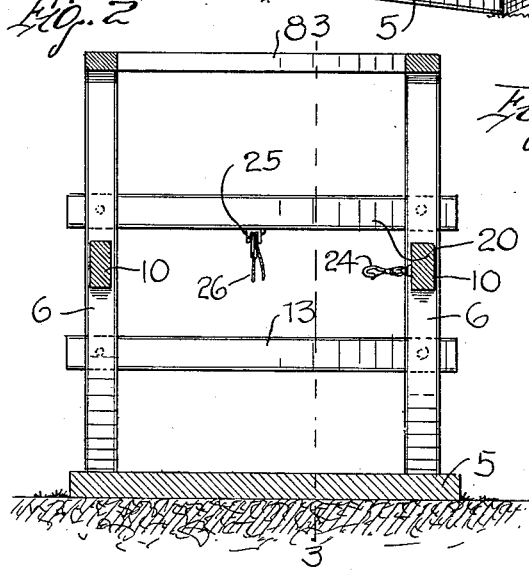
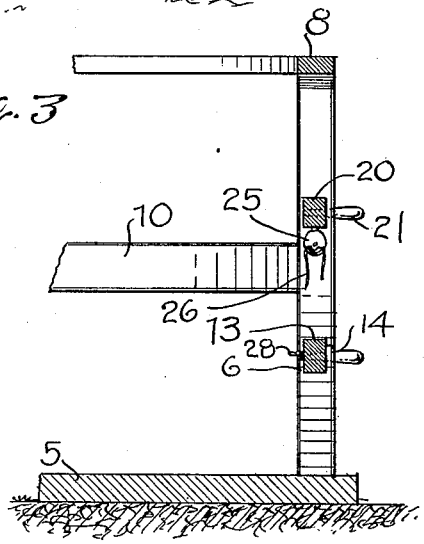
Inventor
POLLY HUFFMAN
Witnesses
Robert M. Sutphen
A. I. Hind
By Watson E. Coleman
Attorney

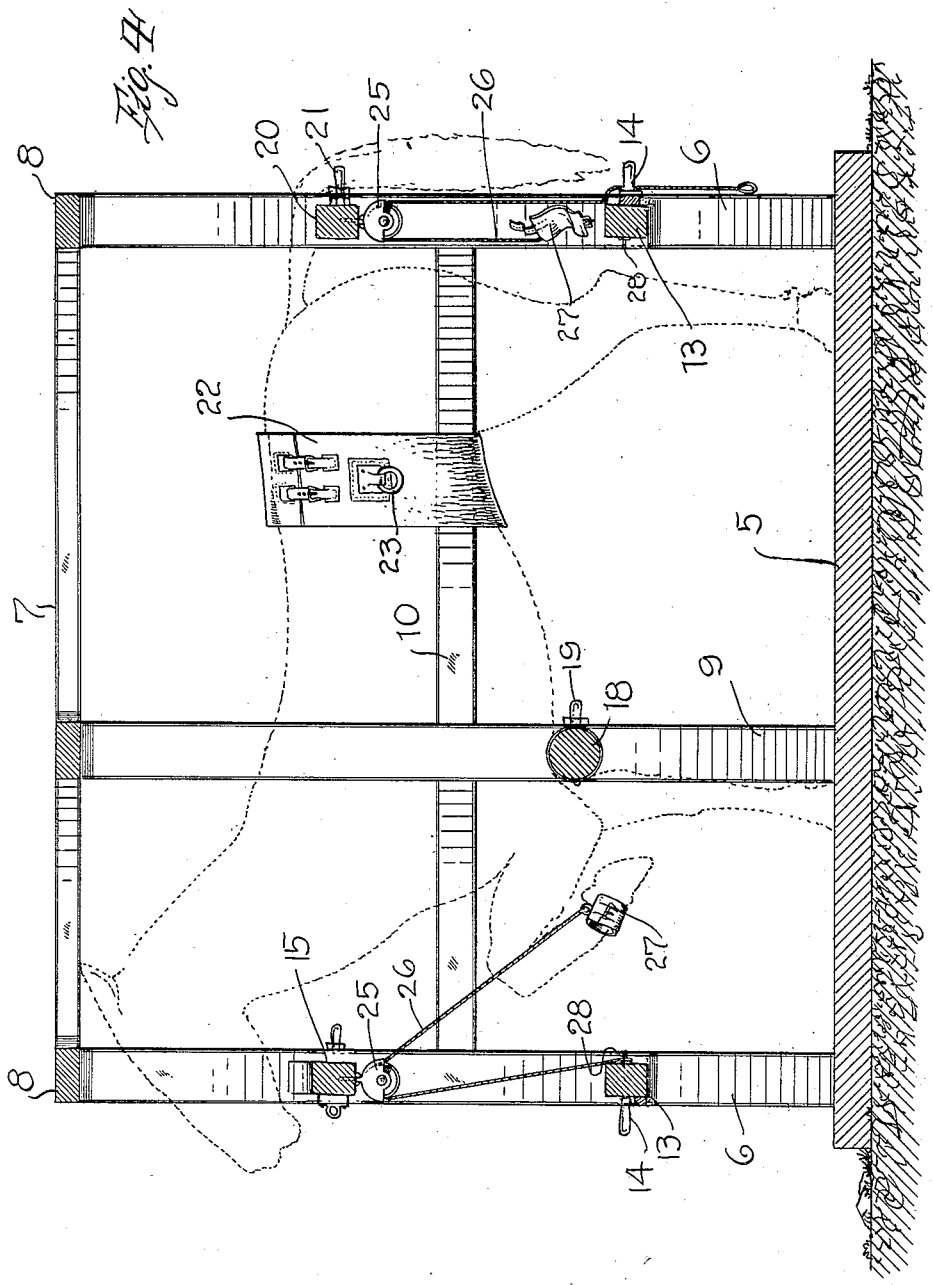

UNITED STATES PATENT OFFICE.

POLLY HUFFMAN, OF CAMERON, TEXAS.

HORSESHOEING-RACK.

1,077,475.　　　　Specification of Letters Patent.　　Patented Nov. 4, 1913.

Application filed February 14, 1913. Serial No. 748,482.

*To all whom it may concern:*

Be it known that I, POLLY HUFFMAN, a citizen of the United States, residing at Cameron, in the county of Milam and State of Texas, have invented certain new and useful Improvements in Horseshoeing-Racks, of which the following is a specification, reference being had to the accompanying drawings.

This invention relates to improvements in horseshoeing devices and has for its primary object to provide a suitable rack or frame in which the animal may be confined and improved means for elevating the hoof of the animal into convenient position for the application of the shoe thereto.

Another object of the invention resides in the provision of a frame or rack including longitudinal bars or rails, a belt or band to encircle the body of the animal and provided with a ring or loop, and a snap hook on one of the rack rails to engage said ring.

A still further object of the invention resides in the provision of a horseshoeing rack which is simple and durable in its construction, may be produced at small cost and is very convenient and serviceable in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a perspective view of a horseshoeing frame or rack embodying the present invention; Fig. 2 is a transverse section of the device; Fig. 3 is a section taken on the line 3—3 of Fig. 2; and Fig. 4 is a vertical section.

Referring in detail to the drawings, 5 designates a base or platform at the corners of which the uprights 6 are arranged and secured in any preferred manner. These corner uprights at their upper ends are connected by the longitudinal and transverse bars 7 and 8, respectively. Adjacent to one end of the platform 5 at the opposite longitudinal edges thereof, the additional vertical bars 9 are arranged. The uprights 6 and 9 are connected and braced intermediate of their upper and lower ends by the longitudinal rails 10. The corner posts or uprights 6 of the frame structure are provided with spaced openings 11 and 12. The lower openings of these uprights are adapted to receive the ends of the transverse confining bars 13 which are held in position by means of suitable pins or bolts indicated at 14. In the upper openings 12 of the front vertical bars 6, the ends of a yoke bar 15 are removably secured by means of the pins or bolts 16. The animal's head projects over this yoke bar and the same may be provided with a ring for the attachment thereto of a hook on the end of a halter strap. The vertical upright bars 9 of the frame are also provided with openings 17 to receive the ends of a yoke bar 18 which extends beneath the animal's body adjacent to the fore legs and is held in place by means of the bolts 19.

In the upper openings 12 of the rear vertical upright bars, the ends of a transverse bar 20 are removably secured by the bolts 21. This bar extends beneath the animal's tail and prevents movement thereof which would interfere with the blacksmith when the animal is being shod. As a further means of confinement for the animal, I provide a body band 22 which is adapted to be buckled around the body of the animal adjacent to the hind legs. This band is provided with a ring or loop 23 to receive a snap hook 24 attached to one of the longitudinal side rails 10 of the frame.

To each of the transverse bars 15 and 20, a block and pulley 25 are attached and around said pulley, the rope 26 extends. This rope is provided upon one of its ends with a sling or loop 27 in which the hoof of the animal is adapted to be fitted. The other end of said rope is provided with an eye for engagement over a nail or other projection 28 fixed to the lower rear transverse bar 13.

From the foregoing description, the construction and operation of the device will be readily understood. The platform 5 is of such proportions as to admit of two men and a horse or other animal standing thereon. After the animal is positioned upon the platform, and confined therein by the front and rear transverse bars and the engagement of the hook on the side rail with the ring in the belt 22, the blacksmith arranges one of the animal's hoofs in the sling 27, and pulls upon the rope 26 to elevate the same. After attaching the rope to the nail 28, the hoof will be supported in convenient position for the application of the shoe thereto and both hands of the operator are free. After the animal has been shod, the front and rear transverse bars may be readily removed so that the animal can be led from the platform. It will be seen from the above that I have produced a device of great convenience and utility whereby the operator is relieved of considerable manual labor in shoeing the animal.

Owing to the simple construction of the invention, it will be obvious that the same is very durable in practical use and may be produced at small cost.

While I have shown and described the preferred construction and arrangement of the several parts it will be understood that the invention is susceptible of considerable modification therein without departing from the essential features or sacrificing any of the advantages of the same.

Having thus described the invention, what is claimed is:

1. A structure of the character described comprising a platform, corner uprights mounted upon said platfom, additional uprights mounted upon the platform adjacent to one of its ends, a single longitudinal rail connecting the series of uprights at each side of the platform, upper and lower confining bars removably mounted at their ends in the corner upright, a transverse bar having its ends mounted in the additional uprights below the longitudinal rails and adapted to extend beneath the animal's body adjacent to the fore legs, means adapted for attachment to said longitudinal rails and designed to encircle the animal's body adjacent the hind legs, and means arranged on each of the front and rear transverse bars for elevating the animal's hoof.

2. A structure of the character described comprising a platform, corner uprights mounted upon said platform, additional uprights mounted upon the platform adjacent to one of its ends, longitudinal rails connecting the additional uprights and the corner uprights, upper and lower transverse confining bars removably mounted at their ends in said corner uprights, a transverse yoke bar removably mounted at its ends in the additional uprights and adapted to extend beneath the animal's body adjacent to the fore legs, a block and pulley attached to one of the rear transverse bars, and a rope extending over said pulley and provided with a sling to receive the animal's hoof whereby the same may be elevated.

In testimony whereof I hereunto affix my signature in the presence of two witnesses.

POLLY X HUFFMAN.
her / mark

Witnesses:
T. S. HENDERSON,
E. J. HUFFMAN.

---

Copies of this patent may be obtained for five cents each, by addressing the "Commissioner of Patents, Washington, D. C."